S. W. ANDERSON & G. C. KAAR.
PROCESS OF PRODUCING LEAD NITRATE SOLUTIONS.
APPLICATION FILED DEC. 27, 1912.
1,083,911.
Patented Jan. 13, 1914.
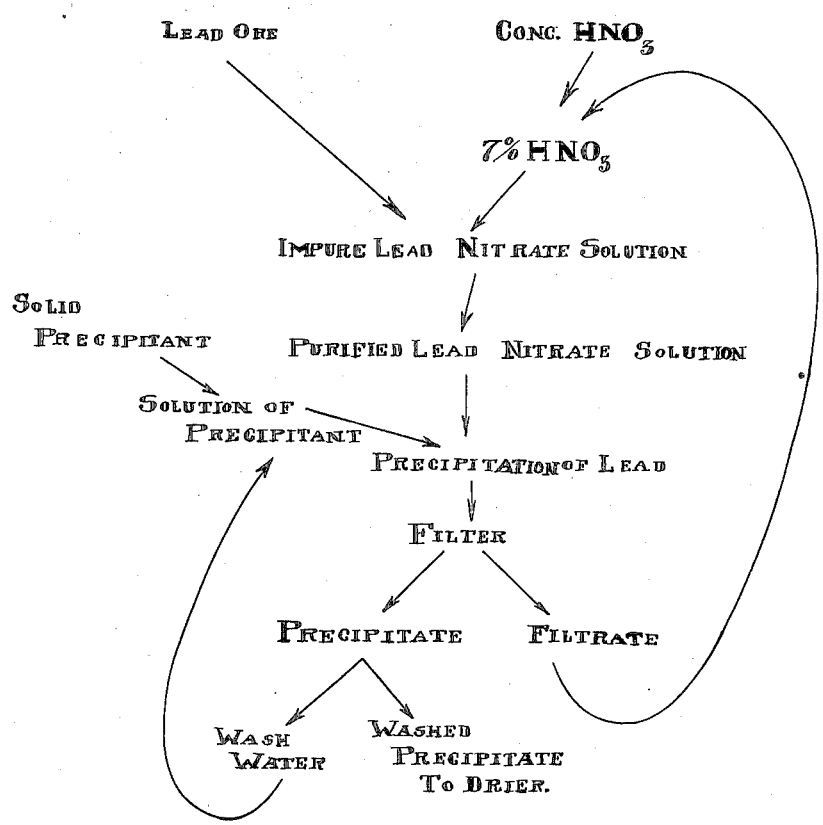

UNITED STATES PATENT OFFICE.

SAMUEL W. ANDERSON AND GROVER C. KAAR, OF SPOKANE, WASHINGTON.

PROCESS OF PRODUCING LEAD-NITRATE SOLUTIONS.

1,083,911. Specification of Letters Patent. Patented Jan. 13, 1914.

Application filed December 27, 1912. Serial No. 738,940.

*To all whom it may concern:*

Be it known that we, SAMUEL W. ANDERSON and GROVER C. KAAR, citizens of the United States, residing at Spokane, in the county of Spokane, State of Washington, have invented certain new and useful Improvements in Processes of Producing Lead-Nitrate Solutions, of which the following is a specification.

This invention relates to the production of lead pigments from lead nitrate solutions obtained by the action of dilute nitric acid on lead sulfid ores; and it comprises a process of obtaining such pigments wherein the filtrates resulting from the precipitation of such pigments are used repeatedly for purposes of diluting the concentrated nitric acid to furnish the necessary dilute acid for dissolving the lead ore; it further comprises a process of precipitating lead from lead nitrate solutions by a precipitant such as sodium chromate, or a mixture of sodium hydroxid and carbonate, in which the wash water used for washing the precipitate is returned and used repeatedly for dissolving the solid precipitant and forming the precipitating solution used in precipitating the lead; and it further comprises combinations of these two processes; all as more fully hereinafter set forth and as claimed.

In our companion application Serial Number 738,939 of even date we have described and claimed a process of dissolving lead sulfid ores by means of dilute nitric acid to form lead nitrate solutions, and of purifying such solutions from accompanying iron nitrate and other impurities to give a pure or relatively pure lead nitrate solution. This process, it is not deemed necessary to describe in detail here, reference being had to said application for a more extended description of the same, but the process described briefly is as follows: Concentrated nitric acid is diluted with dilute nitric acid or a dilute solution of sodium nitrate to give a seven per cent. by weight nitric acid solution. This solution is used at a temperature of from 150 to 165° F. to dissolve lead sulfid ores to form lead nitrate solutions, hydrogen sulfid being formed during the reaction and reacting with part of the nitric acid to set free sulfur and oxids of nitrogen. These oxids of nitrogen are recovered and may be used in part for diluting the concentrated nitric acid. The lead nitrate solution so obtained is separated from the sulfur and silicious sediment and is purified by means of alkalis such as sodium carbonate or sodium hydroxid. The precipitating or purifying agent is added in two instalments so that the iron is completely precipitated as hydroxid and none or but little of the lead precipitated. There results a lead nitrate solution which is relatively pure and which can be used directly for the production of lead pigments. From this lead nitrate solution the lead is precipitated in an insoluble form. This insoluble form may be that of the lead chromate or the basic lead carbonate. In either case the precipitating agent in solution is added to the lead nitrate solution and the insoluble lead compound thus precipitated. This precipitate is filtered, the filtrate separated from the precipitate, the precipitate washed, and then taken to the drier for drying. The wash water resulting from the washing of the precipitate consists of a dilute solution of sodium nitrate and, in making the chromate, nitric acid. It is too dilute for evaporation and recovery of the nitrate contained in it. We have found, however, that it can be used advantageously for dissolving the solid precipitant, being thus returned to the reaction, repeatedly, until its concentration has been sufficiently increased to make its evaporation economically possible.

The filtrate resulting from the filtration of the lead precipitate is a dilute solution of sodium nitrate, but much stronger however, than that of the wash water. If the lead chromate has been precipitated by sodium bichromate, nitric acid is also present. We have found that this filtrate can with advantage be returned to the process and used in diluting the concentrated nitric acid to give the 7% solution used in dissolving the lead ore. The concentration of the filtrate can be thus gradually increased until it becomes sufficiently concentrated to make its evaporation profitable. Moreover the presence of the sodium nitrate in the dilute acid used for dissolving the ore is advantageous since it increases very materially the concentration of the nitrate ions in such acid and thus makes the acid more effective without the presence of an excess of nitric acid.

The series of reactions taking place in the complete process of the present invention and in the novel cycles of it are shown diagrammatically on the accompanying drawing. In this illustration the concentrated nitric acid diluted with the filtrate containing a small amount of sodium nitrate is used as a 7% nitric acid solution to dissolve the lead ore. The impure lead nitrate solution is purified, precipitated, and filtered, the filtrate obtained being that referred to for diluting the concentrated acid. The precipitate is washed and taken to the drier and the wash water used for dissolving the solid precipitant and thus form the precipitating solution. It will of course be understood that only so much of the wash water and filtrate can be returned to the process as are necessary; and that a greater or less amount may be removed continuously or intermittently as the concentration approaches that at which evaporation and recovery of the sodium nitrate is profitable. If the lead is precipitated in the form of the basic carbonate there is used as a precipitating agent a solution containing sodium carbonate and hydroxid in such proportions that the resulting precipitate will have the composition of white lead corroded by the old Dutch process. If the lead is precipitated as chromate a solution of sodium bichromate is used. The following equations illustrate these reactions.

*For basic carbonate.*

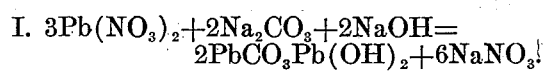
I. $3Pb(NO_3)_2 + 2Na_2CO_3 + 2NaOH = 2PbCO_3Pb(OH)_2 + 6NaNO_3.$

*For normal chromate.*

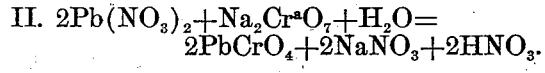
II. $2Pb(NO_3)_2 + Na_2Cr_2O_7 + H_2O = 2PbCrO_4 + 2NaNO_3 + 2HNO_3.$

In either case sufficient of the precipitating agent is added to throw down all of the lead in the form of the insoluble precipitate. The precipitate after filtering is washed and may be then taken to the drier for removing its accompanying water. The pigments are thus obtained in a pure and dry form starting with the ore itself and without first smelting the ore and converting it into metallic lead. The filtrates and wash waters resulting from the filtering and washing of these precipitates are those already referred to. Whether sodium bichromate or a mixture of sodium carbonate and hydoxid is used there results a dilute solution of sodium nitrate, and also nitric acid in the case of the bichromate, from the interaction of the lead nitrate and the soluble sodium salt.

In the filtrate from the lead chromate there is also present more or less nitric acid; but in such a dilute condition that its recovery directly would be unprofitable. Moreover, in recovering the sodium nitrate contained in the solution this nitric acid would need to be first neutralized and thus lost; whereas by returning the whole filtrate to the original nitric acid solution it not only serves to dilute the concentrated acid, but is itself used over again and thus saved. Usually, after being used over two or three times its concentration is such that it can be profitably evaporated and the sodium nitrate thus recovered. This sodium nitrate can be used for the production of the concentrated nitric acid by treating the same with sulfuric acid.

We claim:—

1. A method of preparing a solution of nitrate of lead which comprises digesting crude lead sulfid with a solution containing about 7% of nitric acid, together with a nitrate of an alkali metal.

2. A method of preparing a solution of nitrate of lead which comprises digesting crude lead sulfid with a solution containing about 7% of nitric acid, together with a nitrate of an alkali metal, and thereafter purifying said solution from compounds of the heavy metals, other than lead, by the addition of successive small quantities of an alkali.

In testimony whereof we affix our signatures in presence of two witnesses.

SAMUEL W. ANDERSON.
GROVER C. KAAR.

Witnesses:
L. L. WESTFALL,
WILLIAM H. KAYE.